United States Patent [19]
Chen et al.

[11] Patent Number: 5,915,398
[45] Date of Patent: Jun. 29, 1999

[54] CLEANING STATION FOR CLEANING PARTS OF AN EXHAUST GAS PROCESSING APPARATUS

[75] Inventors: Ying-Hsiang Chen, Chin-chu; Chwan-Der Lee, Miaoli, both of Taiwan

[73] Assignee: Taiwan Semiconductor Manufacturing Company, Ltd., Hsin-Chu, Taiwan

[21] Appl. No.: 08/876,913

[22] Filed: Jun. 16, 1997

[51] Int. Cl.⁶ ........................................ B08B 3/02
[52] U.S. Cl. ................ 134/104.1; 134/111; 134/172; 134/201; 134/115 R
[58] Field of Search .................. 134/104.1, 104.4, 134/201, 111, 135, 115 R, 55, 174, 172, 182; 366/138; 96/281, 44, 47, 53; 101/425; 118/17, 104, 70, 203; 15/4

[56] References Cited

U.S. PATENT DOCUMENTS

| | | | |
|---|---|---|---|
| 2,045,890 | 6/1936 | Uhalt et al. | 134/115 R |
| 4,175,489 | 11/1979 | Gattus . | |
| 4,700,617 | 10/1987 | Lee et al. | 134/115 R |
| 4,740,088 | 4/1988 | Kelly, Jr. . | |
| 4,938,241 | 7/1990 | Teel | 134/201 |
| 5,277,209 | 1/1994 | Olson | 134/201 |
| 5,331,985 | 7/1994 | Lyons | 134/201 |
| 5,456,275 | 10/1995 | Barish | 134/201 |

*Primary Examiner*—Frankie L. Stinson
*Attorney, Agent, or Firm*—George O. Saile; Stephen B. Ackerman; William S. Robertson

[57] ABSTRACT

A cleaning station for cleaning parts from apparatus that itself uses a water spray to clean a toxic gas. The cleaning station has a tray and a sink for holding a part to be spray cleaned and the sink is connected to drain the spray water into the drain system of the gas cleaning apparatus.

3 Claims, 2 Drawing Sheets

CLEANING STATION FOR CLEANING PARTS OF AN EXHAUST GAS PROCESSING APPARATUS

FIELD OF THE INVENTION

This invention relates generally to apparatus for cleaning parts of a gas cleaning apparatus. More specifically, this invention relates to apparatus for cleaning the parts of a CDO (controlled decomposition and oxidation) apparatus.

Introduction

CDO apparatus is well known, but it will be helpful to review the features of apparatus of this type that particularly apply to this invention.

The apparatus receives an exhaust gas and vapors at one end and releases processed gas at its other end. For describing the process, the apparatus can be divided into several sections. In a thermal reaction section, the exhaust gas and vapors are heated and their combustible components are burned or otherwise undergo a thermal reaction. The thermal process creates a powder (or ash) that for the most part is carried by the gas. The next two sections of the apparatus are cooling and scrubbing sections where water is sprayed into the gas to remove the powder.

The apparatus is formed in a U shape with the two cooling and scrubbing sections at the bottom, one on each side of the U shape, and connected by a liquid drain. The apparatus is commonly used for processing the exhaust gas from a semiconductor manufacturing process, and the drain water can contain acid and other toxic materials. In this case, the drain water is lead to a system for preventing these materials from polluting the environment.

The apparatus has the problem that some of the power is left as a residue on the internal components of the apparatus. The apparatus must be partly disassembled and the parts must be cleaned to remove the powder deposits.

More specific features of the apparatus will be described as part of the description of a preferred embodiment of the invention.

SUMMARY OF THE INVENTION

One object of this invention is to improve and simplify the cleaning of the internal parts of the gas processing apparatus. According to our invention, a cleaning station is located near the gas processing apparatus and preferably is attached to a side wall of the apparatus at a convenient height for a person to work at the station while standing.

The cleaning station includes a water spray for washing the parts, a work surface for supporting the parts that are to be cleaned, and an adjoining sink that includes a drain that leads to the drain of the gas processing apparatus. The cleaning station is mounted on a wall of the enclosure of the apparatus in a location where drain connections can be made conveniently to the drain system for removing toxic and acid water from the cleaning apparatus. The work surface has a side wall that is high enough to hold water collected from the spray without interfering with manual cleaning of the parts.

Thus, the invention provides a convenient means for cleaning the parts of a gas processing apparatus and it is environmentally safe. Other features of the invention will be explained in the description of the preferred embodiment.

THE DRAWING

THE PREFERRED EMBODIMENT

Introduction—The CDO Apparatus

Figure 1:
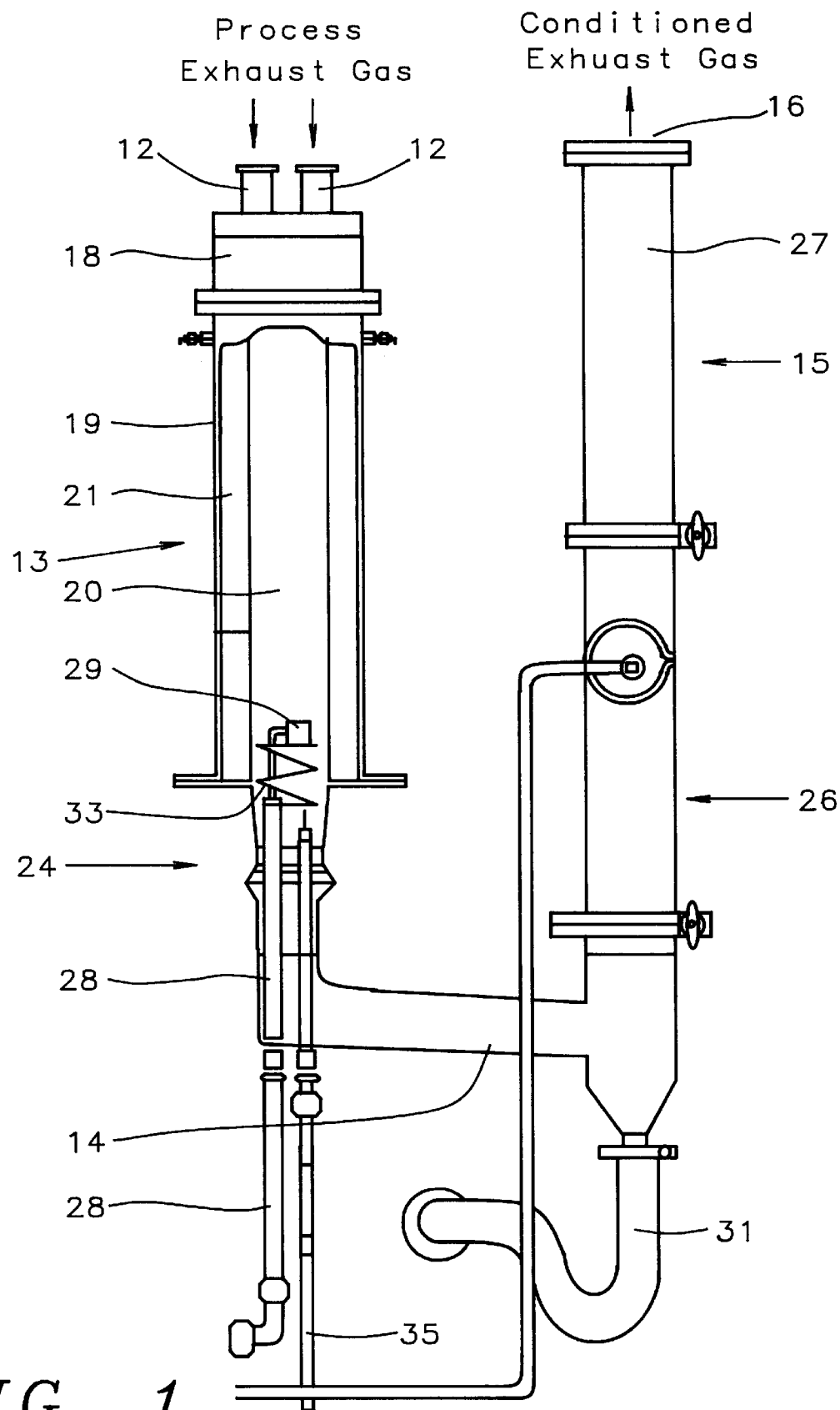
FIG. 1 is a side view, partly in section, of a CDO exhaust gas processing apparatus removed from its enclosure.

As the CDO apparatus is shown in FIG. 1, an exhaust gas enters a system of pipes 12 at top left, flows down the left side 13 of the U shape, through a connection 14 to the right side 15 of the U shape, and up to an outlet 16 at top right. In a preferred application for the invention, the exhaust comes from a semiconductor manufacturing process (not shown).

The first section 18 is an oxygenator section (not broken away) where dry air is mixed with the exhaust gas. The next section, the thermal reaction section 19, has an inner cylindrical part 20 that carries the gas and an outer cylindrical part 21 that contains a heater element for heating the mixture of gas and oxygen.

The contaminants in the gas decompose in a thermal process produced by the heat and the oxygen. This process produces a powder that is removed from the gas in the primary cooling and scrubbing section 24 and the lower secondary cooling and scrubbing section 26. The gas then flows upward through an upper secondary cooling and demister section, 27.

Water is sprayed into the primary cooling and scrubbing section 24. A pipe 28 carries recirculated water to a system of nozzles 29 that spray the water into the heated gas.

Most of the particles of the powder in the gas are trapped by the water droplets and is carried to the bottom of the left side 13 where the water drains through connection 14 to a drain pipe 31. However, the sudden cooling of the powder causes some of it to condense on the walls of the cooling section and around nozzles 29.

Parts of FIG. 1 are broken away to show representative components of the primary cooling and scrubbing section 24 that can be removed and then cleaned by personnel using the cleaning station of this invention.

Section 24 also has a helical shaped part 33, called the wiper coil, which is one of the parts that is to be cleaned. Part 33 is automatically moved up and down to wipe off the powder deposited on the walls. This powder drops into the drain 31.

The secondary scrubbing section 26, shown in a simplified form, also has parts that are removable for cleaning. The oxygenator section 18 and the upper secondary cooling and demister section 27, also shown in a simplified form do not contain parts that are ordinarily removable for cleaning.

Figure 2:
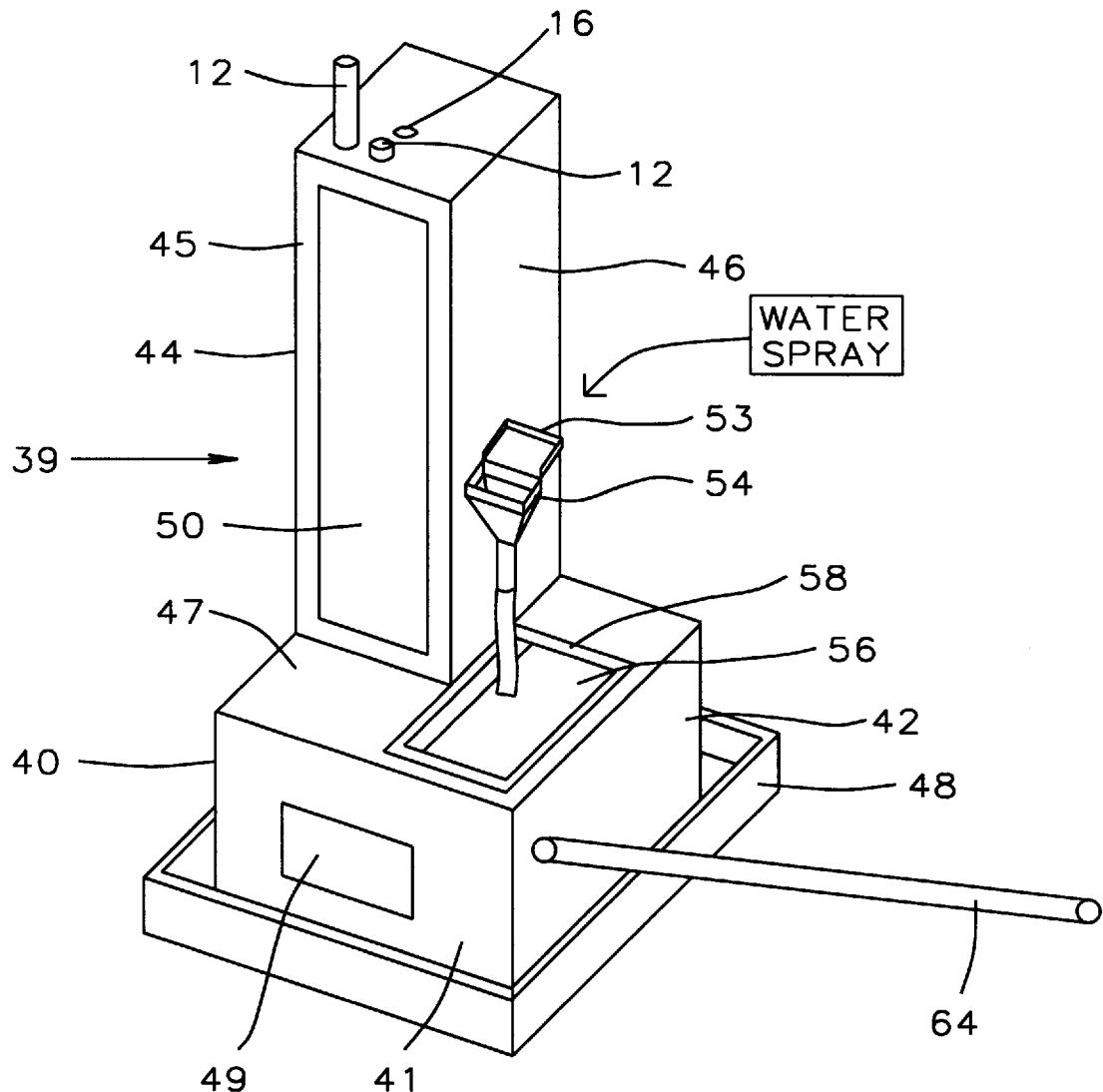
FIG. 2 is an isometric view of the enclosure of the CDO apparatus of FIG. 1 showing the cleaning station of this invention located on a wall of the enclosure.

Introduction—FIG. 2

FIG. 2 shows an enclosure 39 for the apparatus of FIG. 1. The exhaust gas inlet pipes 12 and the air outlet pipe 16 will be familiar from FIG. 1. The enclosure has a base part 40 with rectangular vertical walls (41, 42 are visible) that enclose the lower part of the apparatus, and it has an upper part 44 with rectangular vertical walls (45, 46 are visible). Upper part 44 is narrower than base part 40 and the base has a horizontal top surface 47. A drip pan 48 surrounds base part 40 for catching any leaking water.

Side wall 45 has an access panel 50 that can be opened to remove parts that are to be cleaned and side wall 41 has a removable panel 49 for access to other components of the cleaning apparatus.

A pipe 64 carries water from drain 31 to a drain tank or to a waste treatment facility. The base also encloses a drain pump (not shown) that pumps waste water into pipe 64.

Figure 3:
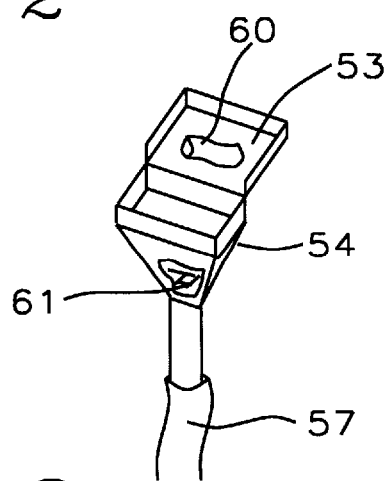
FIG. 3 is a larger view of the cleaning station of FIG. 2, removed from the enclosure.

The Cleaning Station—FIGS. 2 and 3

The cleaning station is located near enough to the cleaning process apparatus of FIG. 1 that waste water from the cleaning station, which may be toxic, can use the drain system of the cleaning process apparatus. Preferably, parts of the cleaning station are attached to enclosure 39. The cleaning station includes a tray 53 and a sink 54 that are preferably mounted on wall 46 of the gas processing apparatus. The tray and sink are located at a convenient height for a person to work at the station while standing.

Tray 53 and sink 54 are located over top 47 of the base, and an opening 56 in top 47 provides an access for a drain pipe 57 from the sink to a tank 58 that is located in the base 40.

FIG. 3 shows a typical part 60 located on the tray for cleaning. The cleaning station also includes a water spray (conventional and shown as a functional box) for washing the parts.

In FIG. 3 the sink is partly broken away to show a filter 61 with a small mesh that is located in the path of water flowing through the sink. (The filter is represented schematically.) In summary, the path of wash waste water begins at tray 53 and/or sink 54, passes through filter 61 and pipe 57 to drain tank 58, then to the pump, and then to pipe 64.

OTHER EMBODIMENTS

From the description of a preferred embodiment of the invention, those skilled in the art will recognize suitable modifications to adapt the cleaning station to other apparatus that produces a toxic residue and has a system for collecting and processing water containing the type of residue that is to be removed at the cleaning station.

We claim:

1. Cleaning station for cleaning parts removed from a cleaning process apparatus that has the following components,
   an outer enclosure (39) having a base part (40) and an upper part (44), each having a first vertical wall (42, 46). said first walls being horizontally offset and wherein the enclosure has a horizontal surface (47) connecting the upper edge of the base first vertical wall and the lower edge of the upper part first vertical wall, and
   a water spray system for removing a product of the cleaning process and a drain (64) for removing the water to a facility for purifying the water,
   wherein the improvement comprises,
      a tray (53) for holding a part (60) being cleaned, and a sink (54), the tray and the sink being mounted on said first vertical wall of the upper part at a convenient height for a person standing at the cleaning station,
      a water spray mean for operating personnel to apply a water spray to a part being cleaned, the sink being adapted to catch the spray directed at a part being sprayed,
      a drain tank (58) located in the enclosure below the sink, means (57) connecting the drain tank to receive spray water from the sink, and an outlet connecting the drain tank to the drain (64) of the cleaning process apparatus, and
      a filter (61) located in the sink and ahead of the connecting means (57).

2. The parts cleaning station of claim 1 wherein the cleaning process apparatus is an exhaust gas cleaning apparatus using a CDO process.

3. The parts cleaning station of claim 1 wherein the upper enclosure part has a second vertical wall adjacent to its first vertical wall and wherein the enclosure includes an access panel (50) in the second vertical wall (45).

* * * * *